United States Patent [19]

Carroll

[11] 4,008,822
[45] Feb. 22, 1977

[54] NON-ROTATABLE FLAME GUARD ASSEMBLY

[75] Inventor: William Michael Carroll, Milwaukee, Wis.

[73] Assignee: Koller Die & Tool Company, Milwaukee, Wis.

[22] Filed: Nov. 24, 1975

[21] Appl. No.: 634,495

[52] U.S. Cl. ............................ 220/94 R; 16/110 A
[51] Int. Cl.² ........................................ B65D 25/28
[58] Field of Search .............. 220/94 R; 294/27 H, 294/31.2; 16/110 A, 110.5, 114 A, 116 R

[56] References Cited

UNITED STATES PATENTS

| 1,306,100 | 6/1919 | Chadwick | 16/114 A |
| 1,333,760 | 3/1920 | Lamb | 16/114 A |
| 1,423,406 | 7/1922 | Donley | 16/114 A |
| 1,594,764 | 8/1926 | Wiltsie | 16/114 A |
| 2,172,524 | 9/1939 | Stevens | 16/114 A |
| 2,979,760 | 4/1961 | Sladky et al. | 16/116 R |
| 3,616,964 | 11/1971 | Yamazaki | 16/116 R |

FOREIGN PATENTS OR APPLICATIONS

| 457,638 | 9/1913 | France | 16/114 A |
| 1,068,401 | 6/1954 | France | 16/110 A |
| 1,077,475 | 7/1967 | United Kingdom | 16/114 A |

*Primary Examiner*—William Price
*Assistant Examiner*—Allan N. Shoap
*Attorney, Agent, or Firm*—Haight, Hofeldt, Davis & Jambor

[57] ABSTRACT

A flame guard assembly for mounting a handle upon a cooking vessel in a manner to facilitate assembly and for precluding relative rotation between the handle and the vessel. The assembly includes an out of round tubular flame guard having contoured ends for mating with the handle and the vessel and a locking plate interlocked to a bracket welded to the vessel. This locking plate receives a bolt extending through the handle and tubular flame guard for fastening the handle and has a non-annular external circumferential dimension for engaging the internal circumference of the tubular flame guard for precluding relative rotation between the handle and the vessel.

7 Claims, 6 Drawing Figures

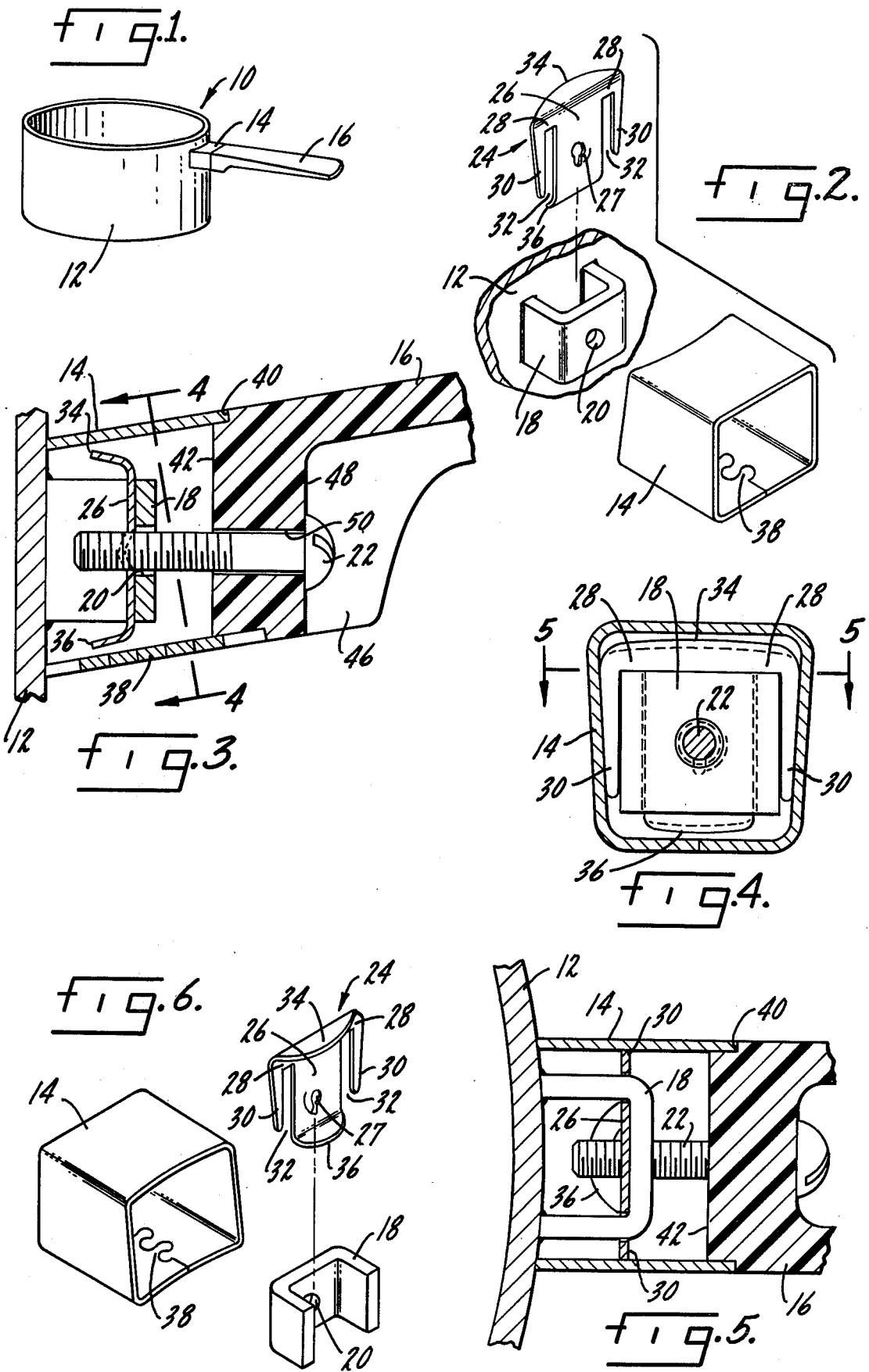

NON-ROTATABLE FLAME GUARD ASSEMBLY

BACKGROUND OF THE INVENTION

This invention relates to a cooking vessel. More particularly, the invention is directed towards a new method of affixing a handle and flame guard to a vessel while simultaneously precluding relative rotation between the handle and the vessle.

Conventionally, cooking vessles have been provided with a threaded weld stud or bracket for bolting a handle thereto. Interposed between the handle and the vessle is a tubular member usually referred to as a flame guard whose ends are contoured to mat with the curvature of the vessel and the handle. The bolt extending from the handle compresses the tubular member between the handle and the vessle, locking the parts together.

Efficient assembly of these units requires dexterity. Moreover, the conventional combination depends upon the tightness of the bolts and the curvature of the vessel to preclude the relative rotation between the handle and the vessle. If the radius of curvature is large or if the bolt works loose, a vessel of hot foodstuffs may be permitted to rotate relative to the handle and spill.

SUMMARY OF THE INVENTION

To alleviate these problems, this invention includes a flame guard — lock plate combination. The flame guard is tubular, non-annular and has contoured ends to mate with the vessle and the handle. Disposed within this flame guard, upon assembly, is a lock plate, preferably formed of stamped metal having a non-annular external circumference mating and engaging with the internal circumference of the flame guard. Interior of the circumference of the plate are two shoulders which are supported upon a U-shaped weld bracket and from which depends a body having a single pitch stamped thread for receiving a bolt attaching the handle. Upon assembly, tightening of the bolt into the lock plate pulls the handle into tight locking engagement with the vessel, precluding relative rotation by virtue of the interlocking relation between the weld bracket, the lock plate, and the flame guard.

Accordingly, it is an object of my invention to provide a flame guard assembly for interconnecting a handle to a cooking vessel. An important object is to provide such a combination which eliminates the possibility of relative rotation of the vessel and the handle in a simple, inexpensive manner. Another object is to eliminate the cost of separately threading the weld bracket, substituting a simply stamped single pitch thread in the lock plate. Also, it is an object of my invention to provide a flame guard assembly which is self aligning and automaticlly forces the flane guard into a fixed proper position on the vessel.

DESCRIPTION OF THE DRAWINGS

The manner in which these and other objects of the invention are accomplished will be made clear with reference to the following description and drawings, in which:

FIG. 1 is a perspective view of a cooking vessel and its associated flame guard and handle;

FIG. 2 is an exploded perspective of a preferred embodiment of the weld bracket, locking plate and flame guard of my invention.

FIG. 3 is a side elevational view in section taken along the vertical center line of the preferred embodiments of FIGS. 1 and 2;

FIG. 4 is a side elevational view in section taken along the lines 4—4 of FIG. 3;

FIG. 5 is a plan view in section taken along the lines 5—5 of FIG. 4; and

FIG. 6 is an exploded perspective view of the weld bracket, locking plate and flame guard of FIG. 2 as seen from the opposite direction.

DETAILED DESCRIPTION

A conventional cooking utensil 10 is depicted in FIG. 1 as comprising a vessel 12, flame guard 14 and handle 16. These components are usually held together by a bolt passing through the handle, the flame guard and into a threaded bracket or weld stud affixed to the vessle 12.

With reference to FIGS. 2 and 3, the weld bracket 18 has a U-shape with each arm or extension being welded or otherwise affixed to the vessel 12. In the center of the bracket is an aperture 20 which, according to my invention, is preferably not threaded and is oversized to permit a bolt 22 to freely pass therethrough. Cooperating with the weld bracket 18 and the bolt 22 is a locking plate 24, having a body portion 26 and a single pitch stamped thread 27 in the central portion thereof. Adjacent the edges of the upper portion of the body 26 are two shoulders having arms 30 depending therefrom to define a recess 32 for telescoping downwardly over each extension of the U-shaped bracket 18. In the assembled position, body 26 is supported between bracket 18 and the vessel 12 by shoulders 28 such that the stamped thread 27 is in horizontal juxtaposition with the enlarged aperture 20 for threadedly receiving bolt 22. Moreover, the external edges of arms 30 are non-annular and are adapted to engage the threaded sidewalls of flame guard 14 as shown in FIG. 4.

As more clearly shown in FIGS. 2 and 3, the body portion 26 of plate 24 is also provided with upper and lower flanges 34 and 36 which preferably form an angle with the body portion of slightly greater than 90 degrees. The ends of these flanges are designed to engage vessel 12 for the primary purpose of spacing the body portion 26 and stamped thread 27 away from the vessel sidewall to facilitate threaded engagement of bolt 22.

The flame guard 14 is tubular and, as shown, has a cross-sectional shape of an isosceles trapezoid. The body of the flame guard is preferably tapered as shown in FIG. 3 so as to provide a large contoured end for telescoping over bracket 18 into abutting engagement with the vessel 12. Excellent contour matching between the large end of the flame guard and the vessel 12 can be achieved by stamping the contours from flat sheet, forming the sheet about a mandrel and interlocking the edges by use of a lock seam 38 such as that shown in Design U.S. Pat. No. 233,000. The opposite end of the flame guard 14 is contoured to mate with a shoulder 4 of handle 16, with a narrower section 42 telescoping into the flame guard 14 for a limited distance. To affix the handle 16 to the vessel 12, an undercut 46 having a vertical surface 48 is provided with a horizontal aperture 50 through which extends the bolt 22.

In assembly of this combination, the U-shaped bracket 18 is first affixed to the vessel 12. Next, the body 26 of locking plate 24 is inserted downwardly into the space between the vessel and the bracket with the shoulders 28 resting upon the upper edges of bracket 18, and the arms 30 extending downwardly along the exterior sidewalls. Subsequently, the handle, with the bolt 22 inserted through the aperture 50 and with the flame guard 14 mounted upon shoulders 40, is placed in juxtaposition with the blacket 18 and the bolt extending through aperture 20, its oversize facilitating alignment. Then the bolt 22 is rotated for threaded engagement with the stamped thread 26 which is already in juxtaposition with aperture 20. Continued tightening of the bolt draws the locking plate 24 outwardly against the interior surface of bracket 18 simultaneously moving the external edges of arms 30 into engagement with the internal walls of flame guard 14. With the outward movement of locking plate 24, the flanges 34 and 36 may also be designed to engage the upper and lower interior surfaces of the flame guard.

With this assembly, the stamped thread provides a resilient bias upon bolt 22, further locking its engagement. The contacting surfaces between the locking plate 24 and the flame guard, being out of round, lock the handle 16 against relative movement with the vessel 12 and both can take many forms. Similarly, many possible forms of the locking plate and bracket may be used. For example, it may be desired to thread aperture 20 to provide a double lock nut effect. Too, only a portion of the external circumference of lock plate need be engaged with the internal surface of the flame guard. Rather than surface engagement, a projection and detent can be formed on the plate and flame guard.

I claim:
1. In a cooking utensil having a vessel and a handle attached thereto, an improved interconnecting means comprising:
   a. a tapered tubular, non-annular flame guard having contoured ends mating with the vessel and the handle;
   b. a locking plate having a stamped thread therein and a non-annular circumference engaging the interior walls of said tubular flame guard;
   c. a bracket mounted on the vessel and having an aperture therein, said bracket having a shape to permit insertion of said locking plate between the bracket and the vessel; and
   d. a bolt passing through said handle, said tubular member, and said aperture for threaded engagement with said stamped thread.
2. An apparatus as recited in claim 1 in which:
   a. said bracket is U-shaped having its extending arms welded to said vessel; and
   b. said locking plate has a body portion inserted between said vessel and said bracket.
3. An apparatus as recited in claim 2 in which:
   a. the circumference of said plate engaging said tubular flame guard comprises flanges forming an angle of greater than 90° to said body portion.
4. An attaching assembly for interconnecting a handle to a cooking vessel comprising:
   a. a tubular flame guard having contoured ends to mate with the handle and the vessel;
   b. a U-shaped member bracket having its extending arms affixed to said vessel;
   c. a locking plate member being positioned between said bracket member and said vessel and having cooperative means engaging said bracket member to preclude relative rotation of said plate member;
   d. a threaded aperture on one of said members for receiving a bolt extending from said handle for affixing said handle to said vessel;
   e. a bolt extending from said handle for threaded engagement with said threaded aperture; and
   f. cooperating locking means on said flame guard and said locking plate member for precluding relative rotation of said flame guard and an associated handle.
5. An apparatus as recited in claim 4 in which said cooperative locking means between said flame guard and said plate member comprises a non-annular external circumferential edge on said plate member and a non-annular flame guard.
6. An apparatus as recited in claim 5 in which:
   a. said flame guard has a tapered body; and
   b. said cooperative locking means includes flanges extending from said plate member, said flanges extending from said body at an angle greater than the angle of said taper.
7. An apparatus as recited in claim 4 in which said threaded aperture is carried by said plate member and said U-shaped bracket has an oversized aperture to permit said bolt to extend therethrough for engagement with said threaded aperture.

* * * * *